(12) United States Patent
Smith

(10) Patent No.: US 7,076,733 B2
(45) Date of Patent: Jul. 11, 2006

(54) ELECTRONIC PROGRAM GUIDE AND METHOD FOR PROGRAMMING AND EDITING ITEMS THEREIN

(75) Inventor: Donn Smith, Boca Raton, FL (US)

(73) Assignee: Pace Micro Technology PLC, West Yorkshire (GB)

( * ) Notice: Subject to any disclaimer, the term of this patent is extended or adjusted under 35 U.S.C. 154(b) by 615 days.

(21) Appl. No.: 10/194,890

(22) Filed: Jul. 12, 2002

(65) Prior Publication Data

US 2004/0008228 A1    Jan. 15, 2004

(51) Int. Cl.
    *G06F 15/00*    (2006.01)
(52) U.S. Cl. .................... 715/716; 725/40; 715/719
(58) Field of Classification Search ................ 715/719, 715/721, 725, 775, 765, 779, 770, 778, 716, 715/723, 728; 725/10, 25, 44, 40, 45, 50
    See application file for complete search history.

(56) References Cited

U.S. PATENT DOCUMENTS

| | | | |
|---|---|---|---|
| 4,974,173 A | 11/1990 | Stefik et al. | |
| 5,144,693 A | 9/1992 | Morgan | |
| 5,227,771 A | 7/1993 | Kerr et al. | |
| 5,434,964 A | 7/1995 | Moss et al. | |
| 5,544,288 A | 8/1996 | Morgan et al. | |
| 5,557,724 A | 9/1996 | Sampat et al. | |
| 5,583,981 A | 12/1996 | Pleyer | |
| 5,615,384 A | 3/1997 | Allard et al. | |
| 5,666,498 A | 9/1997 | Amro | |
| 5,682,487 A | 10/1997 | Thomson | |
| 5,850,218 A * | 12/1998 | LaJoie et al. | .................. 725/45 |
| 5,872,567 A | 2/1999 | Amro | |
| 5,940,077 A | 8/1999 | Amro | |
| 5,943,053 A | 8/1999 | Ludolph et al. | |
| 5,986,657 A | 11/1999 | Berteig et al. | |
| 5,990,889 A | 11/1999 | Amro | |
| 6,011,550 A | 1/2000 | Capps et al. | |
| 6,037,939 A | 3/2000 | Kashiwagi et al. | |
| 6,061,659 A | 5/2000 | Murray | |
| 6,288,702 B1 | 9/2001 | Tachibana et al. | |
| 6,326,970 B1 | 12/2001 | Mott et al. | |
| 6,344,865 B1 | 2/2002 | Matthews, III et al. | |
| 6,421,067 B1 * | 7/2002 | Kamen et al. | ............... 715/719 |

* cited by examiner

*Primary Examiner*—Cao (Kevin) Ngyuen
(74) *Attorney, Agent, or Firm*—Chinh H. Pham; Greenberg Traurig, LLP

(57) ABSTRACT

While programming or editing an entry in an electronic program guide (EPG), the invention expands the dimensions of an EPG display field within the entry, enlarges the font size of the text in the display field, and displays more complete information than that displayed in a normal EPG display mode. EPG entries may include VCR timers, reminders, time blocks, channel preferences, viewing restrictions, and set-top box settings. Display fields may include channels, dates, and start and stop times.

17 Claims, 3 Drawing Sheets

ELECTRONIC PROGRAM GUIDE AND METHOD FOR PROGRAMMING AND EDITING ITEMS THEREIN

BACKGROUND OF THE INVENTION

This invention relates generally to display of an electronic program guide (EPG) on a television screen. More particularly, this invention relates to a method for programming and editing entries in the EPG.

Electronic program guides are the electronic equivalent of a printed television program guide, such as TV Guide®, but they are potentially more customizable. Generally, EPGs display on a television screen a schedule of programs accessible to the television and may include a short summary or commentary for each program. More sophisticated EPGs are used with digital set-top boxes (STBs) and newer television sets, and allow a user to control a VCR or to use the STB as a VCR.

In a conventional EPG, program data are listed in columns (or fields), with headings such as Date, Channel, Program Title, and Summary. For user-interactive program data, such as that associated with VCR recording, a program reminder, or a time block, column headings may include Channel, Day, Start, and Stop. The data in each of these columns are generally chosen by the user based on the program the user wants to record or watch. However, because of space constraints on the television screen, not all of the pertinent information is displayed. For example, only the channel number may be displayed rather than the channel number and name, only the day of the month and abbreviation of the day of the week may be displayed (e.g., "12(Fr)") rather than the full date ("Friday, Jul. 12, 2002"), or only "a" or "p" is displayed rather than "AM" or "PM." In addition, in order to fit even this limited amount of information on the screen, the font may be smaller than visually desirable.

Compensation for inadequate display space in a display window is disclosed in a non-EPG context. U.S. Pat. No. 5,943,053 involves a window on a computer screen made up of subwindows. When a user places a pointer, such as a mouse, in a subwindow having text wider than the width of the subwindow that is thereby obscured by the adjacent subwindow, the obscured subwindow is widened to show all of the text, thereby obscuring the adjacent subwindow. When the user removes the mouse from the subwindow, the subwindow contracts to the original width.

This compensation system is limited, however, because it does not take into account the font size or readability of the text. Thus, if the text in the obscured subwindow is hard to read because the font size is too small, widening the subwindow will not make the text much easier to read. Another reference, U.S. Pat. No. 6,344,865, discloses in the context of a graphical user interface the ability to enlarge font types when viewing the interface from a distance.

SUMMARY OF THE INVENTION

However, neither of these systems involves an EPG, much less creating (e.g., programming) or editing EPG entries. What is needed is a method that displays EPG information in the current display mode, but when programming or editing the information in the EPG expands the display fields, enlarges the font size, and displays more complete information so that the field being programmed or edited is fully comprehensible.

More particularly, when editing a field in an EPG entry, the present invention increases the height and width of the field, increases the font size of text displayed in the field, increases the information content displayed in the field, and, when editing is finished, restores the field height and width, text font size, and information content to the levels used during normal display. This provides more complete information to a user editing a field in an EPG entry and allows the user to read the letters and numbers of the field more easily. EPG entries include, for example, VCR timers, reminders, time blocks, channel preferences, viewing restrictions, and set-top box settings. Editable fields include channels, dates, and start and stop times. Normal display occurs when EPG entries are set and all the fields are visible in the EPG, but at a less readable level than that used during editing. Fields may be edited by scrolling up or down within the field to view adjacent field choices and then selecting one of those choices. Adjacent field choices are those choices that are proximate to each other (generally above or below each other in a vertical field) within the same field. Once one field is finished being edited, a user may edit another field, such as an adjacent field, which may be found to the right or the left of the finished field in the same horizontal entry. The height of the field being edited within the entry may be further increased to allow a user to view adjacent field choices simultaneously.

When programming an EPG field, the invention increases the height and width of the field, inputs a field value into the field, and, when finished programming the field, restores the field height and width to the pre-programming level, reduces the text font size, and reduces the information content of the field to contain only partial information. When a field value is input into the field, the field value is displayed in a readably large text font size and includes complete information about the field. Such inputted field value may be entered by the user and received by the STB, or the STB may enter a default field value in the field.

Thus, an EPG according to the present invention includes programmable and editable fields having height and width that can be increased in size as compared to a normal display mode and field text having a small font size when in normal display mode and an increased font size during programming and editing modes. The information content displayed while programming or editing EPG fields is more complete than that displayed during normal display mode.

The primary benefit of this invention is to more clearly and effectively display information to an EPG user when the user is programming or editing the EPG. This produces an EPG that is easier to use, with fewer errors, and, therefore, results in fewer customer service calls from users.

Additional advantages of the invention will be set forth in the description which follows, and in part will be apparent from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

Figure 1:
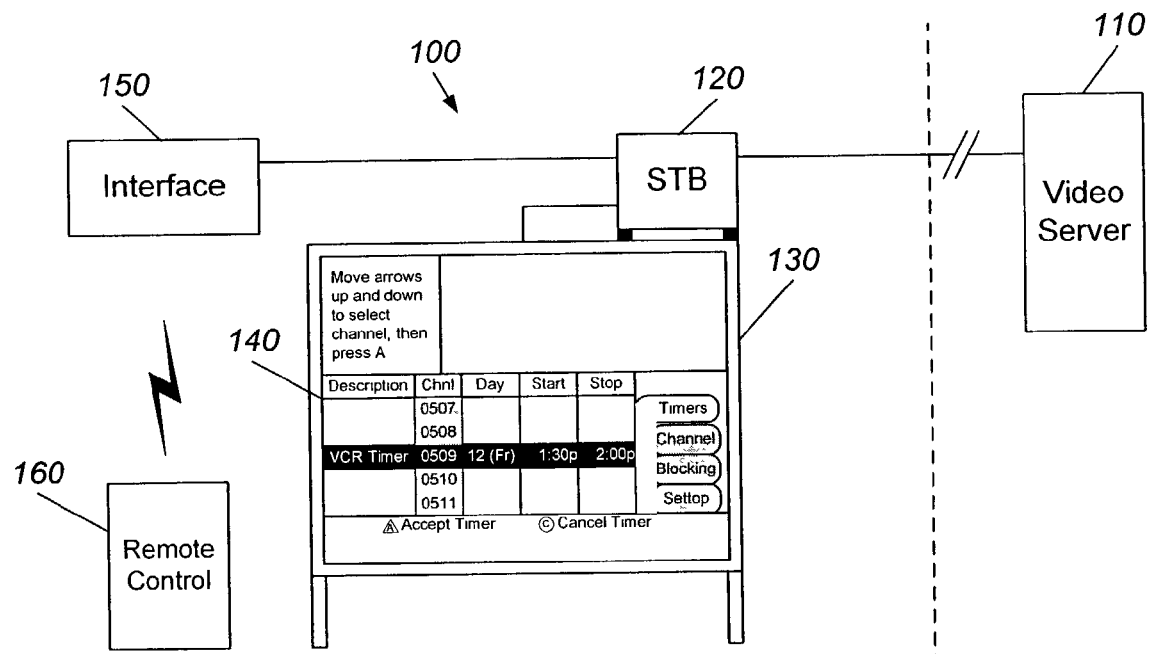
FIG. 1 is a block diagram illustrating a system including an electronic program guide (EPG) in accordance with an embodiment of the present invention.

FIG. 1 is a block diagram that illustrates an embodiment of a system containing the present invention. Included in such a system 100 are video server 110, set-top box (STB) 120, television (TV) 130, interface 150, and remote control 160. Displayed on TV 130 is EPG 140. Video server 110 is typically a computer comprising a central processing unit (CPU), memory, and input/output (I/O) means. Video server 110 is connected to STB 120 to deliver a wide range of video programming such as movies, video games, television shows, sports, and other programming as is typically offered or will be offered by cable television and satellite television providers.

STB 120 can be a set-top box as known generally in the art, capable of receiving video programming from video server 110 and decoding (if needed) and transmitting such programming to TV 130. As part of the present invention, STB 120 is able to display EPG 140. As shown in more detail in FIG. 2, some of the features 250 that EPG 140 may offer include timers 252, channels 254, blocking 256, and settop settings 258. Timers 252 may include VCR timers, program reminders, power-on timers, power-off timers, and sleep timers. Channels 254 may specify which channel will display on the TV when the TV is turned on and which channels are designated as favorites. Blocking 256 may offer blocking of programming based on program rating, channel, time of day, viewer identity, etc. Settop settings 258 may include miscellaneous STB settings such as whether the AC outlet on the back of STB 120 is active, whether the current channel or current time is displayed on the front of STB 120, etc.

TV 130 may include any type of television monitor that can broadcast video programming. This includes conventional cathode-ray tubes (CRTs), LCD monitors, plasma monitors, HDTV monitors, and other monitors. Although pictured as separate from TV 130, STB 140 may be integrated into TV 130, so long as TV 130 includes the proper means for connecting to video server 110.

Interface 150 is used to set up the user's preferences with respect to the EPG's features. As described herein, and as generally available, such EPG will be displayed on TV 130, but it is within the present invention for interface 150 to include a display separate from that of TV 130 on which to display the EPG. Although pictured as a separate block in FIG. 1, interface 150 is preferably integrated with STB 120. If STB 120 is integrated with TV 130, interface 150 may still be integrated with STB 120, allowing STB 120, interface 150, and TV 130 to be a single physical unit. Remote control 160 can be any conventional remote control, but is programmed to interact with interface 150 and STB 120. It is also possible for a user to interact with interface 150, STB 120, and TV 130 without using remote control 160, but such interaction may be limited. In addition to or instead of remote control 160, there may be a keyboard with a mouse for inputting a user's preferences into interface 150 or STB 120.

Figure 2:
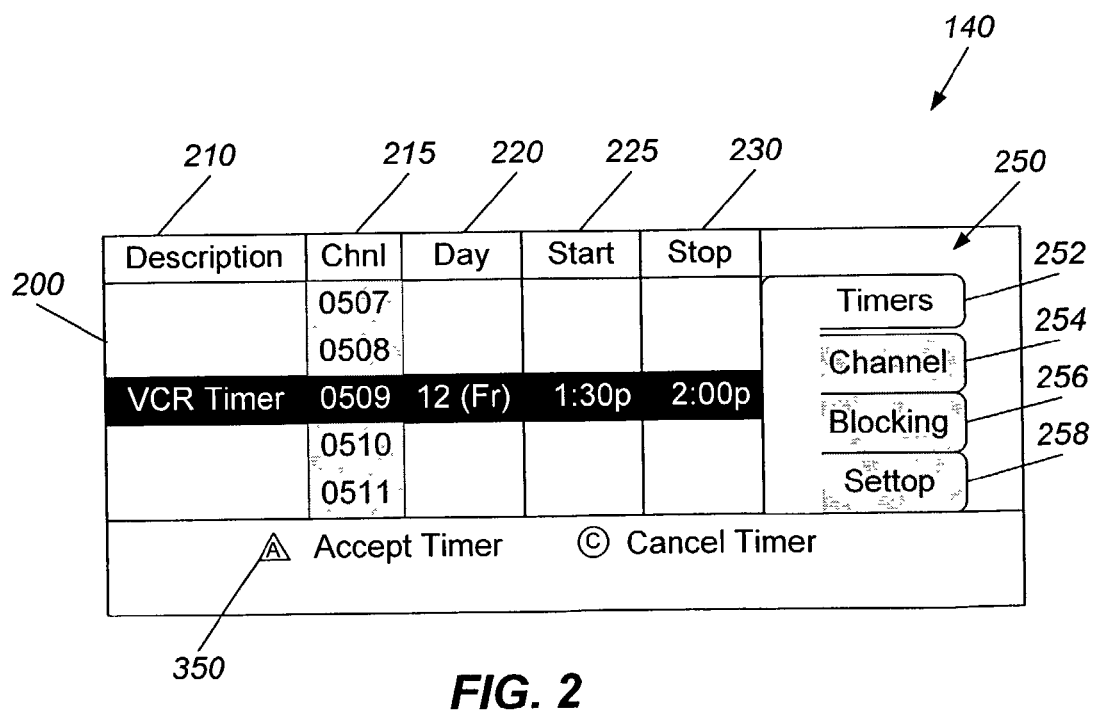
FIG. 2 is a diagram of an EPG in normal display mode in accordance with an embodiment of the present invention.

FIG. 2 is a diagram of EPG 140 in its normal display mode. In one embodiment, EPG 140 covers only the bottom half of the TV screen, with the upper left quadrant of the TV screen occupied by a status window and the upper right quadrant of the TV screen occupied by a TV capture window (e.g., picture-in-picture). In addition to feature tabs 250 described above, EPG 140 is typically made up of an editing window 200 having fields (columns) of information. In the embodiment shown in FIG. 2 and used to describe the invention, EPG 140 is displaying a VCR timer, which displays in field 215 the channel to be recorded, the day of recording in field 220, and the start and stop times for recording in fields 225 and 230, respectively. In the normal display mode of FIG. 2, the field text is abbreviated in order to display to the user the needed fields. Thus, in channel field 215, only the channel number is displayed instead of displaying both the channel number and the channel name. Similarly, in day field 220, only the day of the month and an abbreviated day of the week are displayed, instead of displaying the day of the week, day of the month, month, and year.

While the normal display mode in FIG. 2 may be adequate for viewing purposes, it is inadequate for programming and editing purposes. Instead, FIGS. 3A, 3B, 4A, and 4B provide two embodiments of the invention that display the currently-edited or -programmed field in a more readable fashion, and provide more complete information to the user. When editing an entry (i.e., row) in EPG 140, using remote control 160, the user navigates through the EPG so that the display shows the timer to be edited, and timer entry 310 is then highlighted. The user then presses the right arrow key to enter channel field 215. Instead of merely highlighting the currently-selected channel (e.g., "0509") in the same font size as displayed in FIG. 2, the invention enlarges the height and width of the field, obscuring neighboring fields 210, 220 for the time being, and displaying in a larger font size both the currently-selected channel number and name (e.g., "509 NBC"). In this disclosure, when a field within an entry is being viewed, programmed, or edited, that field has a width related to that of the corresponding EPG column, and a height related to that of the EPG entry.

The size of editing box 320 should be large enough to accommodate enough information for the user to make an informed selection, and so that the displayed field is readable at a typical TV viewing distance. In order to edit the field, a user may scroll up and down the column, for example, using the arrows on remote control 160, and the font size of each highlighted channel increases to be readable at the viewing distance. Alternatively, the user may enter the desired channel using the keypad on remote control 160. As the channel numbers are being entered, they will be displayed in the same large font size.

Once the desired channel is selected, the user may press "A" key 350 (for "Accept Timer") or a "Select" or "Enter" button to confirm the selection. Once confirmed, the enlarged box will return to its normal display size, and the font size of the channel field will also be reduced to normal display size. In another embodiment, the selection may be confirmed by pressing a right arrow key. In that case, enlarged channel box 320 will return to its normal display size, the font size of the channel field will also be reduced to normal display size. In addition, day field 220 will be highlighted, as shown in FIG. 3B, enlarging day field box 330 to accommodate enough information for the user to make an informed selection, and so that the displayed field is readable at a typical TV viewing distance. Day field 220 may be edited in the same manner as channel field 215, and the selection confirmed either by pressing "A" key 350, "Select" or "Enter," or the right arrow key. The user may similarly edit start field 225 and stop field 230, and, while editing each field, the editing box and font size will be enlarged.

Figure 3A:
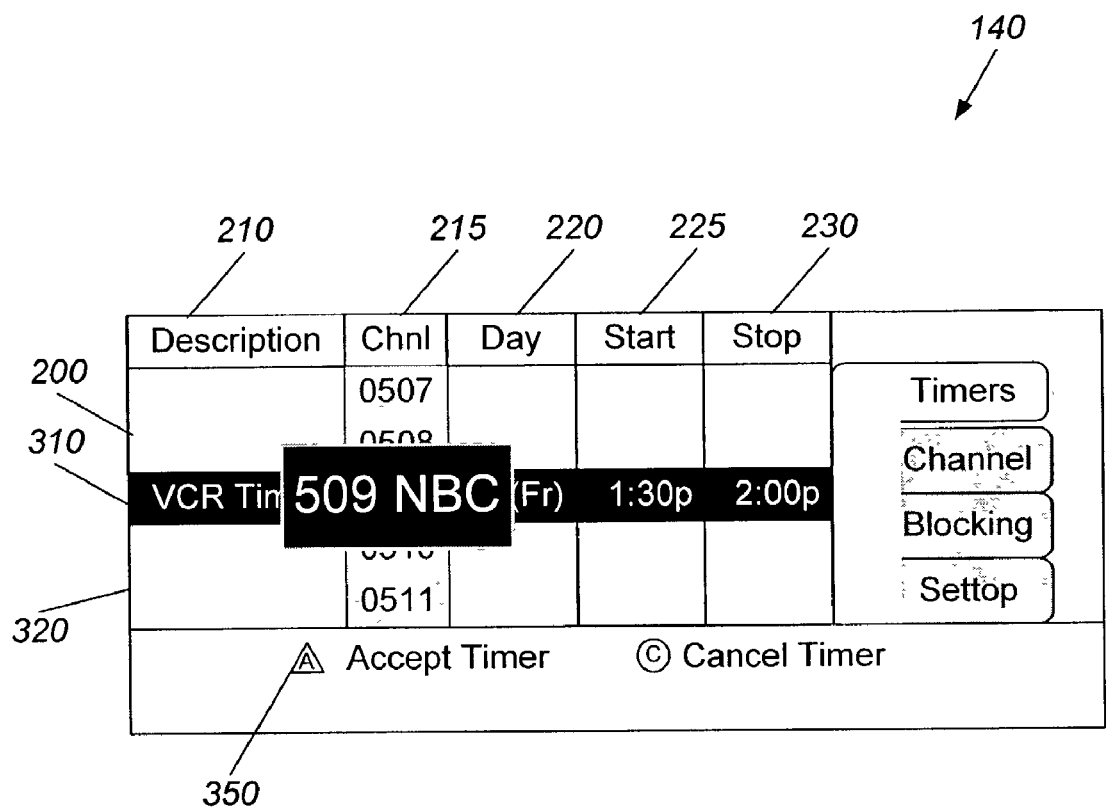
FIGS. 3A and 3B are diagrams illustrating editing or programming fields in an EPG in accordance with an embodiment of the present invention.
Figure 3B:
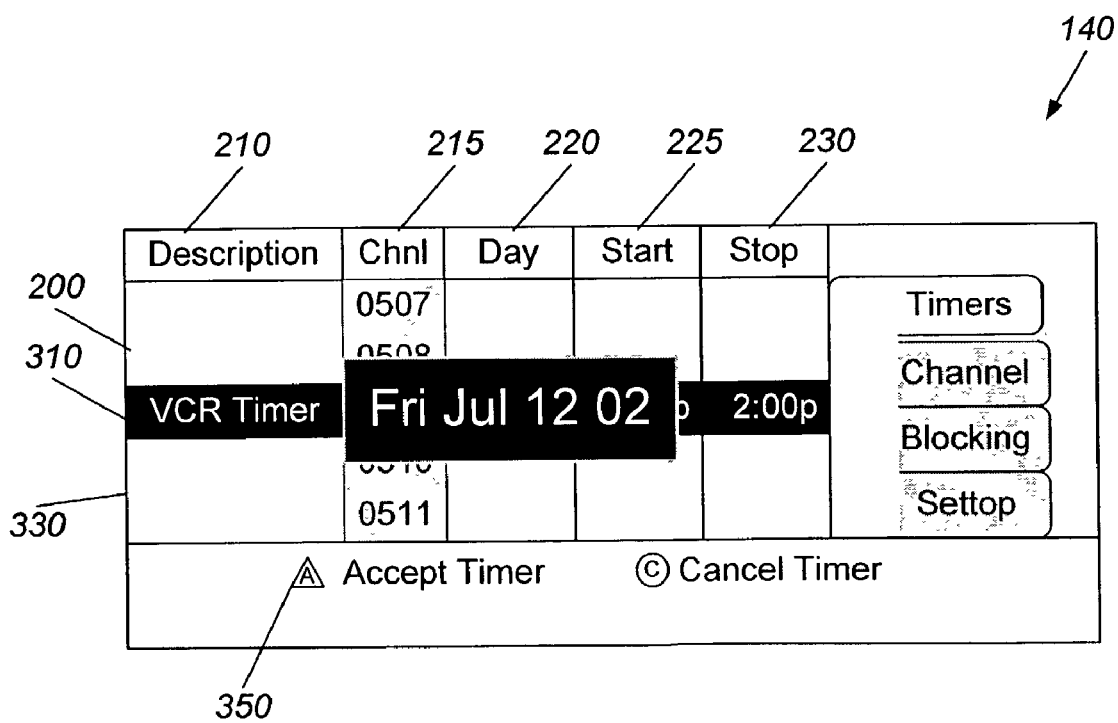
Figure 4A:
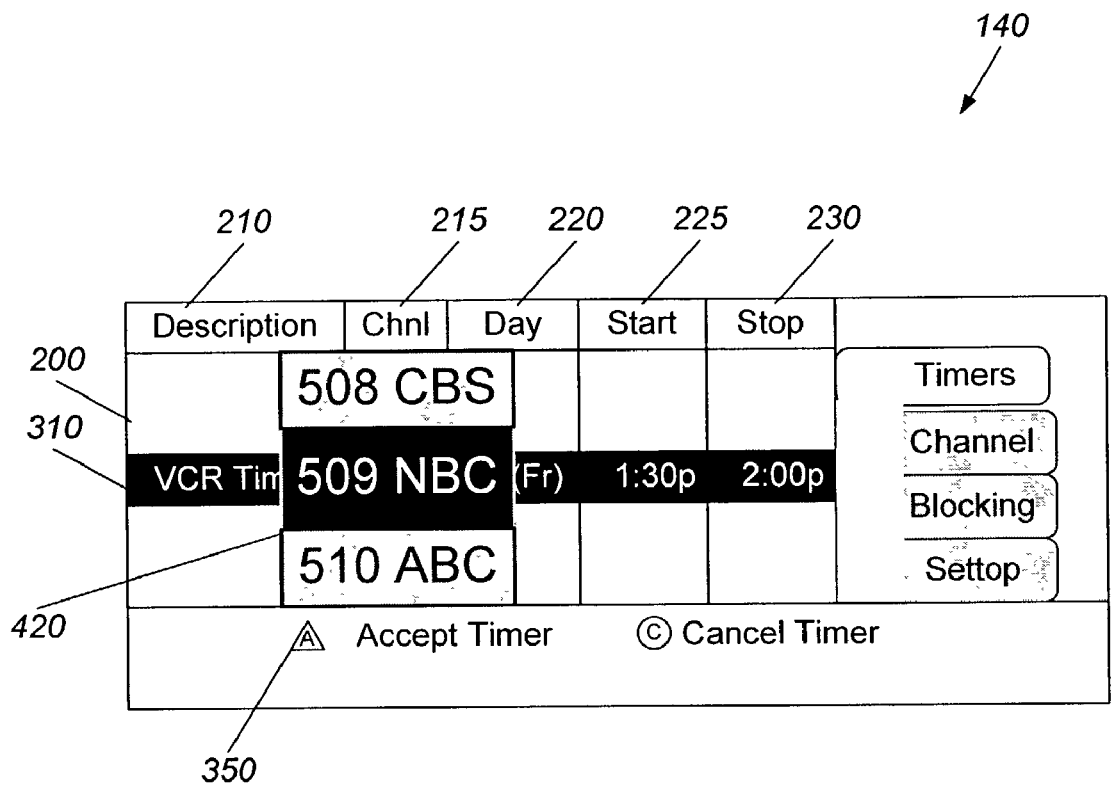
FIGS. 4A and 4B are diagrams illustrating editing or programming fields in an EPG in accordance with a second embodiment of the present invention.
Figure 4B:
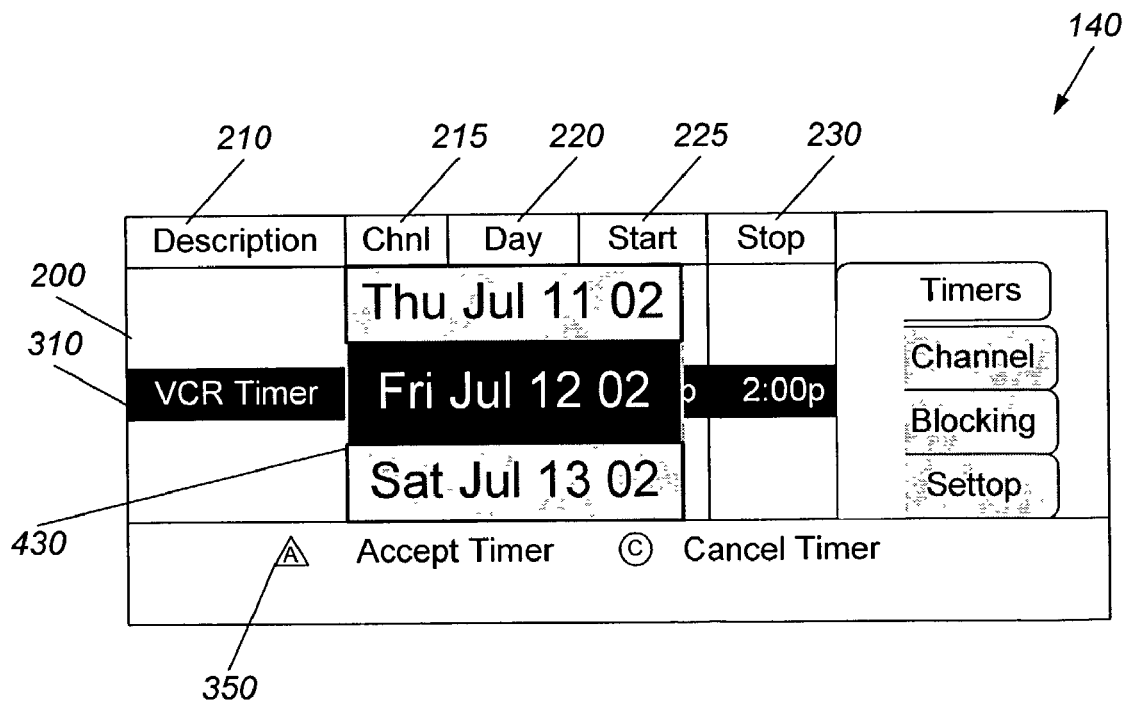

FIGS. 4A and 4B illustrate a slightly different editing box than those shown in FIGS. 3A and 3B. In these figures, the editing box is larger, covering nearly the entire editing window from the top to the bottom, and including adjacent choices within the field. Thus, editing box 420 not only includes channel "509 NBC" as did editing box 320, but also includes channels "508 CBS" and "510 ABC." Editing box 420 is large enough to accommodate enough information for the user to make an informed selection, and each of the channels in editing box 420 is displayed in an increased font size so that the displayed field is readable at a typical TV viewing distance. Channel field 215 may be edited by scrolling up and down the column, using, for example, the arrows on remote control 160, with the currently-selected channel appearing in the middle of editing box 420, and the font size of each highlighted channel within editing box 420 readable at the typical viewing distance. Alternatively, the user may enter the desired channel using the keypad on remote control 160. As the channel digits are entered, they are displayed in the same large font size. The selection may be confirmed by pressing, for example, either "A" key 350, "Select" or "Enter," or the right arrow key on remote control 160.

If the right arrow key is pressed, enlarged channel editing box 420 will return to its normal display size, the font size of the channel field will also be reduced to its normal display size, and day field 220 will be highlighted, as shown in FIG. 4B. Editing box 430 is larger than editing box 330 of FIG. 3B, covering nearly the entire editing window from the top to the bottom, and including adjacent choices within the field, e.g., "Thu Jul 11 02" and "Sat Jul 13 02." Day field 220 may be edited in the same manner as channel field 215, and the selection confirmed by pressing, for example, either "A" key 350, "Select" or "Enter," or the right arrow key. As before, once the day selection is confirmed, the user may similarly edit start field 225 and stop field 230, and, while editing each field, the editing box and font size will be enlarged, and the time will preferably include "AM" or "PM."

The editing boxes according to the present invention may be produced as follows. EPG 140 is generally implemented in software resident on STB 120. Specialized operating systems and C-language application program (or programming) interfaces (APIs) are commercially available to program an EPG. One operating system is called PowerTV, available from PowerTV, Inc., Cupertino, Calif. The PowerTV operating system makes the STB operate when connected to a network and provides an API on which the EPG can be programmed. Using the PowerTV Application Development API Reference, an EPG programmer can lay out an EPG by specifying the size of editing window 200, the widths of the field columns, the highlighting of timer entry 310, the display and functionality of features 250, as well as the entry and editing of data into EPG 140.

More specifically, in order to create editing boxes having larger dimensions than in normal display mode, the programmer makes calls to the operating system and, using coordinates, sets the width and height of the editing box, its location, the font used, and the text displayed. An example is to set the width of the editing box to double that of the normally-displayed field, and to set the height to double normal height. These values can vary, of course, based upon how large editing window 200 is, the visual preferences of the programmer or the EPG provider, and the amount of information needed to appear within the box to provide more complete comprehension. Then, the font size may be specified as twice the font size as in the normal display mode. The colors of the editing box may be chosen, also, especially in the case of editing boxes 420, 440 in which it is helpful if the currently-edited selection (e.g., "509 NBC" in FIG. 4A) has a background different from that of the non-selected, adjacent items within the same field (e.g., "508 CBS" and "510 ABC"). Finally, each channel has associated with it a channel name (e.g., NBC, CBS, ABC) that is displayed when the editing box is used to edit the channel field and suppressed when in normal display mode.

Although this description has discussed editing items in an EPG, the invention is also directed to the initial programming of items in an EPG entry. For example, when first scheduling a program to be recorded (i.e., a VCR timer), a user chooses timers feature 252 from feature tabs 250. After STB 120 determines that the user wants to program a new timer (rather than edit an existing timer), a large editing box is displayed in description field 210 displaying "Reminder," for example, in a large font. The user can scroll through editing choices and choose from among "Reminder," "VCR Timer," "Power-on Timer," "Power-off Timer," and "Sleep Timer." After selecting "VCR Timer," the user advances to channel field 215 to choose the channel. The first channel to be displayed in the enlarged editing box and large font may be, for example, Channel 1 (appearing as, e.g., "001 CAB"), or the channel to which STB 120 is currently tuned, or a favorite channel. After selecting the desired channel, e.g., "509 NBC," the user advances to day field 220. The first day to be displayed may be the current day or a default day such as "Mon Jan 01 01." Once the day is selected, start field 225 appears in the enlarged box with large font displaying, for example, the current time or the next upcoming half-hour (e.g., if the current time is 3:48 PM, the time appearing would be 4:00 PM). Finally, once the start time is selected, stop field 230 appears, displaying, for example, the selected start time or a time a half-hour or an hour later. After selecting the stop time, the user accepts the timer by pressing, for example, "A" key 350, "Select," or "Enter," and the timer appears in normal display mode as shown in FIG. 2.

The other features 254, 256, 258 indicated in the figures can be programmed and edited in the same manner as timers 252. With those features, there is a normal display mode (as in, for example, FIG. 2) and an editing/programming mode in which the editing box appears larger with more text and in a font size larger than that of the normal display mode.

Additional advantages and modifications will readily occur to those skilled in the art. For example, the invention may also be used to browse the EPG. In this scenario, program entries in the EPG displaying, for example, the viewing schedule for the next three hours appear in a small font with narrow columns (fields) and abbreviated data, similar to that shown in FIG. 2. In order to better read a program entry, a user could enter a "browse" mode (by, for example, pressing a button on remote control 160 to toggle the meaning of the arrow keys). Once in the browse mode, the user could "walk" across the program entry, enlarging the size of each field and the font size of the corresponding field text, thereby allowing the field to display more information, and thereby allowing the user to find out more about specific programs than is available from the EPG in normal display mode.

Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

I claim:

1. A method for editing a field in an electronic program guide (EPG) entry, comprising:
increasing the height and width of the field;
increasing the font size of text displayed in the field;
increasing the information content displayed in the field; and
when finished editing the field, restoring the field height and width, text font size, and information content of the field to the levels used during normal display;
wherein increasing the height and width of the field comprises making the field large enough to accommodate enough information content for a user to make an informed selection.

2. The method according to claim 1, wherein increasing the text font size comprises increasing the font size to a level at least where the text is readable at a typical viewing distance.

3. The method according to claim 1, further comprising editing the field by scrolling up or down within the field to view adjacent field choices.

4. The method according to claim 3, wherein the text font size and information content of the adjacent field choices are the same as those of the field when editing began.

5. The method according to claim 1, further comprising further increasing the height of the field to enable multiple adjacent field choices to be displayed simultaneously.

6. The method according to claim 5, further comprising editing the field by scrolling up or down within the field to view more adjacent field choices.

7. A method for programming a field in an electronic program guide (EPG) entry, comprising:
increasing the height and width of the field;
inputting a field value into the field, the field value displayed in a readably large text font size and including complete information content; and
when finished programming the field,
restoring the field height and width to the pre-programming level;
reducing the text font size; and
reducing the information content of the field to contain only partial information;
wherein increasing the height and width of the field comprises making the field large enough to accommodate enough information content for a user to make an informed selection.

8. The method according to claim 7, wherein the text font size is at a level at least where the text is readable at a typical viewing distance.

9. The method according to claim 7, wherein inputting a field value comprises receiving from a user a field value to be placed into the field.

10. The method according to claim 7, wherein inputting a field value comprises placing a default field value into the field.

11. The method according to claim 10, further comprising programming the field by scrolling up or down within the field to view adjacent field choices.

12. The method according to claim 11, wherein the font size and information content of the adjacent field choice remain the same.

13. The method according to claim 10, further comprising further increasing the height of the field to enable multiple adjacent field choices to be displayed simultaneously.

14. The method according to claim 13, further comprising programming the field by scrolling up or down within the field to view more adjacent field choices.

15. An electronic program guide (EPG), comprising:
programmable and editable fields designed to receive user input during programming and editing mode, the fields having height and width that can be increased in size when in editing and programming mode as compared to a normal display mode; and
field text having a small font size when in normal display mode and an increased font size during programming and editing modes, wherein the information content displayed while programming or editing EPG fields is more complete than that displayed during normal display mode;
wherein increasing the height and width of the field comprises making the field large enough to accommodate enough information content for a user to make an informed selection.

16. The EPG according to claim 15, wherein the height of the programmable and editable fields can be further increased to allow adjacent field choices to be viewed simultaneously.

17. The EPG according to claim 16, wherein the increased text font size is at a level at least where the text is readable at a typical viewing distance.

* * * * *